US012390384B2

(12) United States Patent
Weatherly

(10) Patent No.: US 12,390,384 B2
(45) Date of Patent: Aug. 19, 2025

(54) PHYSICAL THERAPY PERSONAL PROTECTIVE SCREEN APPARATUS, METHOD AND KIT

(71) Applicant: Robert Weatherly, Abingdon, VA (US)

(72) Inventor: Robert Weatherly, Abingdon, VA (US)

( * ) Notice: Subject to any disclaimer, the term of this patent is extended or adjusted under 35 U.S.C. 154(b) by 476 days.

(21) Appl. No.: 17/844,246

(22) Filed: Jun. 20, 2022

(65) Prior Publication Data

US 2023/0011462 A1    Jan. 12, 2023

Related U.S. Application Data

(60) Provisional application No. 63/219,724, filed on Jul. 8, 2021.

(51) Int. Cl.

*A61G 13/10* (2006.01)
*A61G 13/00* (2006.01)
*A61G 13/08* (2006.01)

(52) U.S. Cl.

CPC ........... *A61G 13/10* (2013.01); *A61G 13/009* (2013.01); *A61G 13/08* (2013.01)

(58) Field of Classification Search

CPC ...... A61G 13/009; A61G 13/08; A61G 13/10; A47B 2200/0084; A47B 2200/0085; A47B 2200/12; A47C 21/00; A47C 19/028; A61B 90/00; A61F 5/37; A61N 2005/1097

See application file for complete search history.

(56) References Cited

U.S. PATENT DOCUMENTS

| | | | | |
|---|---|---|---|---|
| 883,884 | A * | 4/1908 | Hopkins ................ | A47C 21/00 5/513 |
| 2,556,913 | A * | 6/1951 | Gilbert .................. | A47C 21/00 5/513 |
| 3,582,170 | A | 6/1971 | Jenkintown | |
| 5,609,112 | A | 3/1997 | Meyer et al. | |
| 9,516,946 | B1 | 12/2016 | Edwards | |
| 10,765,910 | B2 | 9/2020 | Salamone | |
| 10,822,796 | B2 | 11/2020 | Udagawa et al. | |
| 11,160,376 | B2 | 11/2021 | Gass et al. | |
| 2011/0009903 | A1 | 1/2011 | Estrada | |
| 2011/0316228 | A1 * | 12/2011 | Stites ..................... | A63B 67/04 273/126 R |
| 2012/0199048 | A1 | 8/2012 | Savalas | |
| 2012/0304441 | A1 | 12/2012 | Henriott | |
| 2016/0232809 | A1 | 8/2016 | Harris et al. | |
| 2019/0242182 | A1 | 8/2019 | Newhouse et al. | |
| 2019/0262658 | A1 | 8/2019 | Salamone | |
| 2021/0307984 | A1 | 10/2021 | Akers | |
| 2021/0353075 | A1 * | 11/2021 | Ward ........................ | A47F 9/04 |

OTHER PUBLICATIONS

Clear safety screens with mount brackets, accessed on Mar. 31, 2022, available at www.worthingtondirect.com/partitions-and-room-dividers-1/clear-dividers-and-partitions-1/clear-acrlic-safety-screens-mount-brackets-by-ofd-office-furniture-2.htm.

* cited by examiner

*Primary Examiner* — Alireza Nia
*Assistant Examiner* — Gina McCarthy
(74) *Attorney, Agent, or Firm* — Robinson IP Law, PLLC

(57) ABSTRACT

A physical therapy protective screen apparatus for providing safety and privacy for persons being treated on a physical therapy table. The physical therapy protective screen apparatus includes a planar rigid barrier held in place by at least a first attachment member on a physical therapy table.

17 Claims, 15 Drawing Sheets

PHYSICAL THERAPY PERSONAL PROTECTIVE SCREEN APPARATUS, METHOD AND KIT

CROSS-REFERENCE(S) TO RELATED APPLICATION(S)

This application claims priority to U.S. Provisional Patent Application No. 63/219,724 entitled "EXER-GUARD PHYSICAL THERAPY PERSONAL PROTECTIVE SCREEN" filed on Jul. 8, 2021, the entirety of which is incorporated herein by reference.

FIELD

This disclosure relates to the field of physical therapy tables and physical therapy mats. More particularly, this disclosure relates to a protective screen apparatus for use in conjunction with a physical therapy table or mat.

BACKGROUND

Physical therapy services are often carried out with a patient resting on a physical therapy table which often includes a padded mat. Some physical therapy tables are large enough to hold multiple persons. Because patients can be located so close together in such settings, there is a danger that one patient could easily transfer a pathogen to a second patient such as, for example, a viral disease or bacterial disease. There is also often a desire by patients to have privacy during exercises and associated treatment. What is needed, therefore, is a way to better protect physical therapy patients who are in close proximity to one another and to provide privacy to such patients, particularly when such patients are sharing a physical therapy table.

SUMMARY

The above and other needs are met by a physical therapy protective screen apparatus configured for use on a physical therapy table, the physical therapy protective screen apparatus comprising a first planar rigid barrier; and a first attachment member including a first base plate and a first pair of parallel vertical holders extending up perpendicularly from the first base plate, the first pair of parallel vertical holders being spaced apart in a configuration such that a lower portion of the first planar rigid barrier fits securely between the first pair of parallel vertical holders. When in use, the physical therapy protective screen apparatus further comprises the first attachment member resting on a physical therapy table. The first attachment member preferably further comprises a first securing member extending through one of the vertical holders of the first pair of vertical holders to secure the first planar rigid barrier to the first attachment member.

The physical therapy protective screen apparatus may further comprise a second planar rigid barrier; and a second attachment member including a second base plate and a second pair of parallel vertical holders extending up perpendicularly from the second base plate, the second pair of parallel vertical holders being spaced apart in a configuration such that a lower portion of the second planar rigid barrier fits securely between the second pair of parallel vertical holders. The second attachment member preferably further comprises a second securing member extending through one of the vertical holders of the second pair of vertical holders to secure the second planar rigid barrier to the second attachment member.

In some embodiments, the second attachment member further comprises a first side attachment member wherein a first end of the first side attachment member is hingedly attached to a first end of the first base plate, the first side attachment member further comprising a first side attachment member first section configured to extend around a first outer edge of a physical therapy table when the first base plate is located proximate to a first edge of said physical therapy table; and a first side attachment member second section comprising a first U-shaped bracket configured to fit at least partially around a first portion of a base frame of said physical therapy table. The first side attachment member second section preferably includes a first securing component located along a first side of the first U-shaped bracket wherein the first securing component can be adjusted to exert pressure against said first portion of said base frame of said physical therapy table to secure the first side attachment member to said first portion of said base frame of said physical therapy table. The first securing component preferably comprises a first threaded tightening bolt which can be screwed inward or outward through a first threaded aperture along the first side of the first U-shaped bracket.

The physical therapy protective screen apparatus may further include a third attachment member comprising a third base plate and a third pair of parallel vertical holders extending up perpendicularly from the third base plate, the third pair of parallel vertical holders being spaced apart in a configuration such that a lower portion of the first planar rigid barrier fits securely between the third pair of parallel vertical holders; a second side attachment member wherein a first end of the second side attachment member is hingedly attached to a first end of the third base plate, the second side attachment member further comprising a second side attachment member first section configured to extend around a second outer edge of said physical therapy table when the third base plate is located proximate to a second edge of said physical therapy table; and a second side attachment member second section comprising a U-shaped bracket configured to fit at least partially around a second portion of a base frame of said physical therapy table. The second side attachment member second section preferably includes a second securing component located along a first side of the second U-shaped bracket wherein the second securing component can be adjusted to exert pressure against said second portion of said base frame of said physical therapy table to secure the second side attachment member to said first portion of said base frame of said physical therapy table. The second securing component preferably comprises a second threaded tightening bolt which can be screwed inward or outward through a second threaded aperture along the first side of the second U-shaped bracket. The first attachment member preferably further comprises a second securing member extending through one of the vertical holders of the first pair of vertical holders to secure the second planar rigid barrier to the first attachment member.

In another aspect, embodiments of the disclosure provide a method for physically screening patients on a physical therapy table, the method comprising placing a first attachment member along an upper surface of a physical therapy table, the first attachment member comprising a first base plate and a first pair of parallel vertical holders extending up perpendicularly from the first base plate, the first pair of parallel vertical holders being spaced apart in a configuration such that a lower portion of a first planar rigid barrier can fit securely between the first pair of parallel vertical holders; and securing the first planar rigid barrier to the first attachment member by inserting the lower portion of the first planar rigid barrier between the first pair of vertical parallel holders. The step of the securing the first planar rigid barrier to the first attachment member preferably further comprises adjusting a first securing member in the first attachment member to secure the first planar rigid barrier to the first securing member.

The method may further include placing a second attachment member along said upper surface of said physical therapy table, the second attachment member comprising a second base plate and a second pair of parallel vertical holders extending up perpendicularly from the second base plate, the second pair of parallel vertical holders being spaced apart in a configuration such that a lower portion of a second planar rigid barrier can fit securely between the second pair of parallel vertical holders; and securing the second planar rigid barrier to the second attachment member by inserting the lower portion of the second planar rigid barrier between the second pair of vertical parallel holders. The step of the securing the second planar rigid barrier to the second attachment member preferably further comprises adjusting a second securing member in the second attachment member to secure the second planar rigid barrier to the second securing member.

In some embodiments, the step of placing the second attachment member along an upper surface of a physical therapy table further comprises engaging a first U-shaped bracket of the second attachment member with a first portion of a base frame of said physical therapy table, wherein the second attachment member further comprises a first side attachment member wherein a first end of the first side attachment member is hingedly attached to a first end of the second base plate, the first side attachment member further comprising (i) a first side attachment member first section configured to extend around a first outer edge of said physical therapy table when the first base plate is located proximate to a first edge of said physical therapy table and (ii) a first side attachment member second section comprising the first U-shaped bracket configured to fit at least partially around said first portion of said base frame of said physical therapy table; and placing the second base plate proximate to said first edge of said physical therapy table. The step of placing the second attachment member along an upper surface of a physical therapy table may further comprise adjusting a first securing component wherein the second attachment member comprises the first securing component located along a first side of the first U-shaped bracket wherein the first securing component can be adjusted to exert pressure against said first portion of said base frame of said physical therapy table to secure the first side attachment member to said first portion of said base frame of said physical therapy table.

The method embodiments described above may further include placing a third attachment member along an upper surface of said physical therapy table, the third attachment member comprising a third base plate and a third pair of parallel vertical holders extending up perpendicularly from the third base plate, the third pair of parallel vertical holders being spaced apart in a configuration such that a lower portion of the first planar rigid barrier can fit securely between the third pair of parallel vertical holders; engaging a second U-shaped bracket of the third attachment member with a second portion of said base frame of said physical therapy table, wherein the third attachment member further comprises a second side attachment member wherein a first end of the second side attachment member is hingedly attached to a first end of the third base plate, the second side attachment member further comprising (i) a second side attachment member first section configured to extend around a second outer edge of said physical therapy table when the third base plate is located proximate to a second edge of said physical therapy table and (ii) a second side attachment member second section comprising the second U-shaped bracket configured to fit at least partially around said second portion of said base frame of said physical therapy table; placing the third base plate proximate to said second edge of said physical therapy table; and securing the first planar rigid barrier to the third attachment member by inserting the lower portion of the first planar rigid barrier between the third pair of vertical parallel holders. The step of placing a third attachment member along an upper surface of a physical therapy table may further comprise adjusting a second securing component wherein the third attachment member comprises the second securing component located along a first side of the second U-shaped bracket wherein the second securing component can be adjusted to exert pressure against said second portion of said base frame of said physical therapy table to secure the second side attachment member to said second portion of said base frame of said physical therapy table.

In another aspect, embodiments of the disclosure provide a kit for a physical therapy protective screen apparatus, the kit comprising a first planar rigid barrier; and a first attachment member including a first base plate and a first pair of parallel vertical holders extending up perpendicularly from the first base plate, the first pair of parallel vertical holders being spaced apart in a configuration such that a lower portion of the first planar rigid barrier can fit securely between the first pair of parallel vertical holders.

The kit may further comprise a second planar rigid barrier; and a second attachment member including a second base plate and a second pair of parallel vertical holders extending up perpendicularly from the second base plate, the second pair of parallel vertical holders being spaced apart in a configuration such that a lower portion of the second planar rigid barrier can fit securely between the second pair of parallel vertical holders.

The second attachment member may further comprise a first side attachment member wherein a first end of the first side attachment member is hingedly attached to a first end of the second base plate, the first side attachment member further comprising a first side attachment member first section configured to extend around a first outer edge of a physical therapy table when the first base plate is located proximate to a first edge of said physical therapy table; and a first side attachment member second section comprising a first U-shaped bracket configured to fit at least partially around a first portion of a base frame of said physical therapy table.

The kit may further comprise a third attachment member comprising a third base plate and a third pair of parallel vertical holders extending up perpendicularly from the third base plate, the third pair of parallel vertical holders being spaced apart in a configuration such that a lower portion of the first planar rigid barrier can fit securely between the third pair of parallel vertical holders, the third attachment member further comprising a second side attachment member wherein a first end of the second side attachment member is hingedly attached to a first end of the third base plate, the second side attachment member further comprising a second side attachment member first section configured to extend around a second outer edge of said physical therapy table when the third base plate is located proximate to a second edge of said physical therapy table; and a second side attachment member second section comprising a U-shaped bracket configured to fit at least partially around a second portion of a base frame of said physical therapy table; wherein the first side attachment member second section includes a first securing component located along a first side of the first U-shaped bracket wherein the first securing component can be adjusted to exert pressure against said first portion of said base frame of said physical therapy table to secure the first side attachment member to said first portion of said base frame of said physical therapy table; and wherein the second side attachment member second section includes a second securing component located along a first side of the second U-shaped bracket wherein the second securing component can be adjusted to exert pressure against said second portion of said base frame of said physical therapy table to secure the second side attachment member to said first portion of said base frame of said physical therapy table.

The first attachment member may further comprise a first securing member extending through one of the vertical holders of the first pair of vertical holders to secure the first planar rigid barrier to the first attachment member, and a second securing member extending through one of the vertical holders of the first pair of vertical holders to secure the second planar rigid barrier to the first attachment member.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control. In the claims, the term "said" is used in conjunction with a term that already has an antecedent basis but that is not being claimed as part of the invention.

A physical therapy protective screen apparatus is disclosed, the apparatus including a planar rigid barrier, a first attachment member, and a second attachment member. The physical therapy protective screen apparatus is used in conjunction with a physical therapy table. The physical therapy screen apparatus provides a barrier between persons being treated on the physical therapy table. The barrier is useful to minimize the spread of disease as well as to provide privacy in embodiments in which the barrier is opaque or translucent. Currently, large physical therapy tables are used which can fit multiple patients at a time but with no barrier of any kind between the patients. What is needed is a physical screening device to physically separate patients for the health and privacy.

Figure 1:
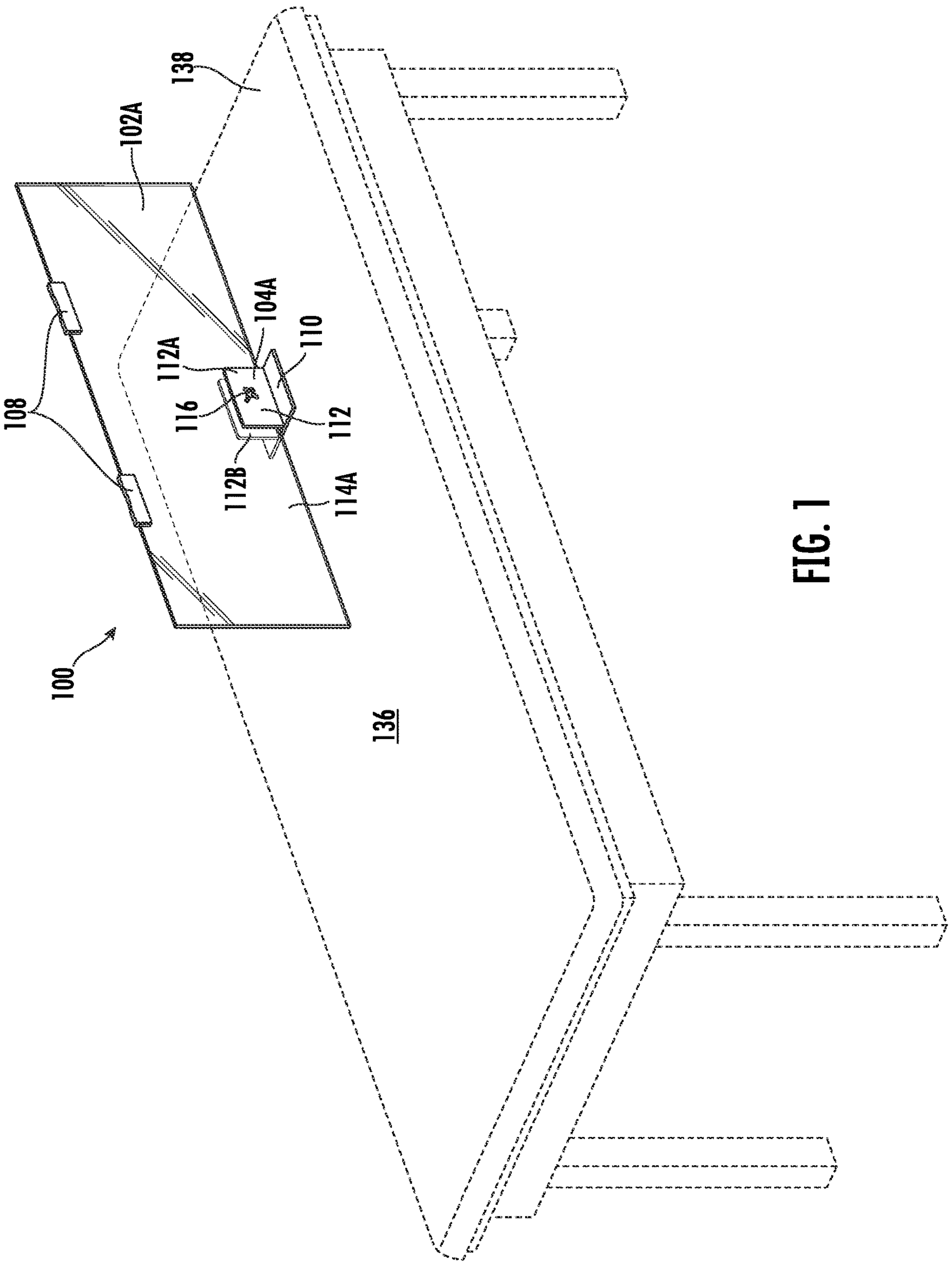
FIG. 1 shows a perspective view of a first embodiment of a physical therapy protective screen apparatus including a first planar rigid barrier and a first attachment member.
Figure 2:
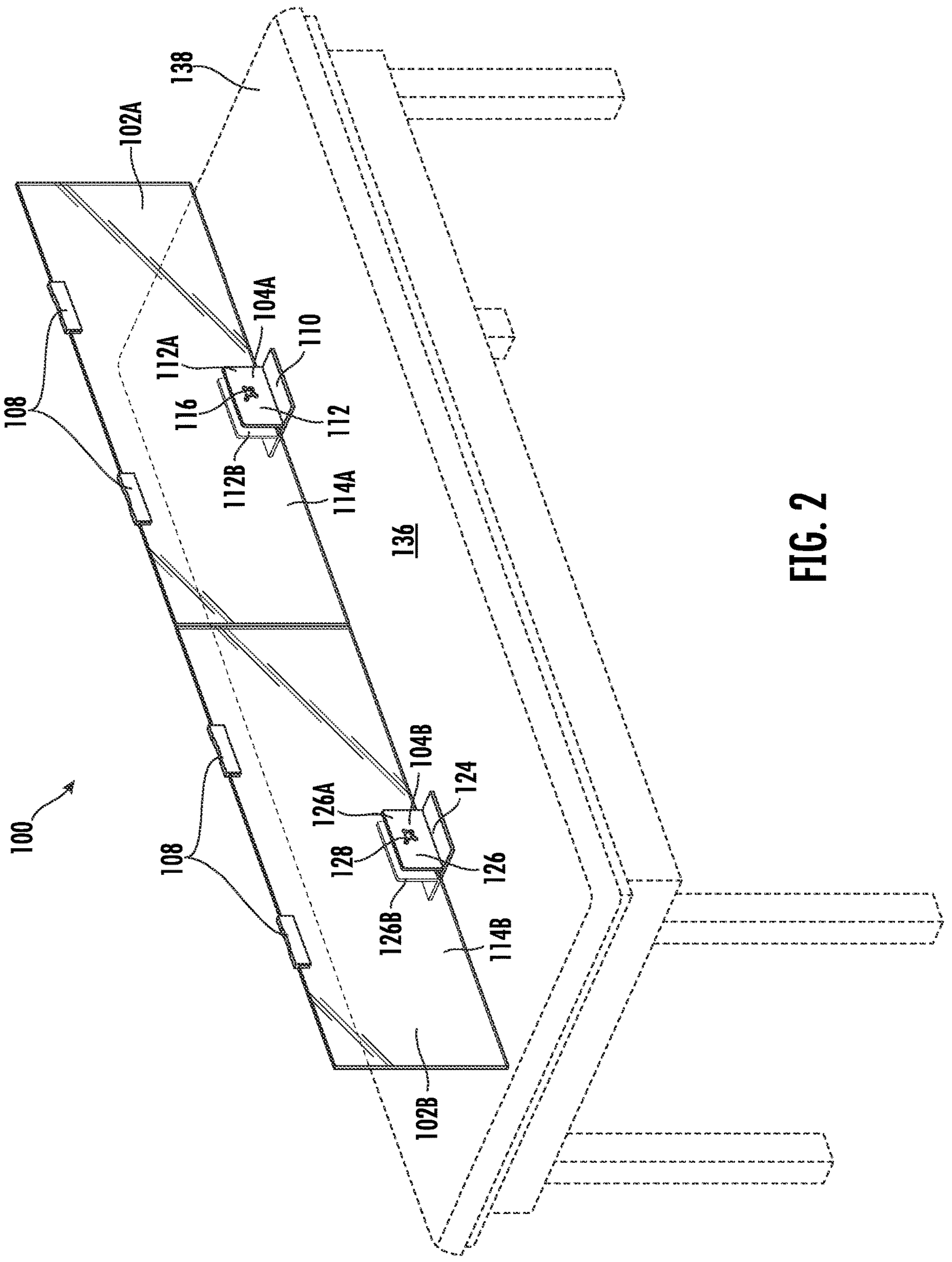
FIG. 2 a perspective view of a second embodiment of a physical therapy protective screen apparatus including the first planar rigid barrier, the first attachment member, a second planar rigid barrier, and a second attachment member.

FIG. 1 shows a first embodiment of a physical therapy protective screen apparatus 100 including a first planar rigid barrier 102A and a first attachment member 104A. The barrier 102 can be transparent, translucent, or opaque. When privacy is a concern, translucent or opaque barriers are preferred. The barrier can be made of various materials including metal, metal alloy, plastic, wood, polymer-based materials, and composite materials. In a preferred embodiment, the barrier 102 is made of polymethyl methacrylate (plexiglass). Barrier 102 size can vary in different contemplated embodiments, but in one preferred embodiment, a 2-foot-high 4-foot-wide barrier is used. In a related embodiment, two of these sized barriers are used together to extend a length of about 8 feet on a physical therapy table as shown in FIG. 2 which also shows a second planar rigid barrier 102B and a second attachment member 104B. The barriers 102 preferably have a thickness of about 0.22 inches, but other thicknesses are contemplated. In a preferred embodiment, the barriers 102 can include one or more gripping handles 108 attached thereto wherein the gripping handles 108 are preferably made of rubber. The gripping handles 108 may be attached to the barriers using an adhesive or other means of attachment known to persons having ordinary skill in the art.

Figure 3:
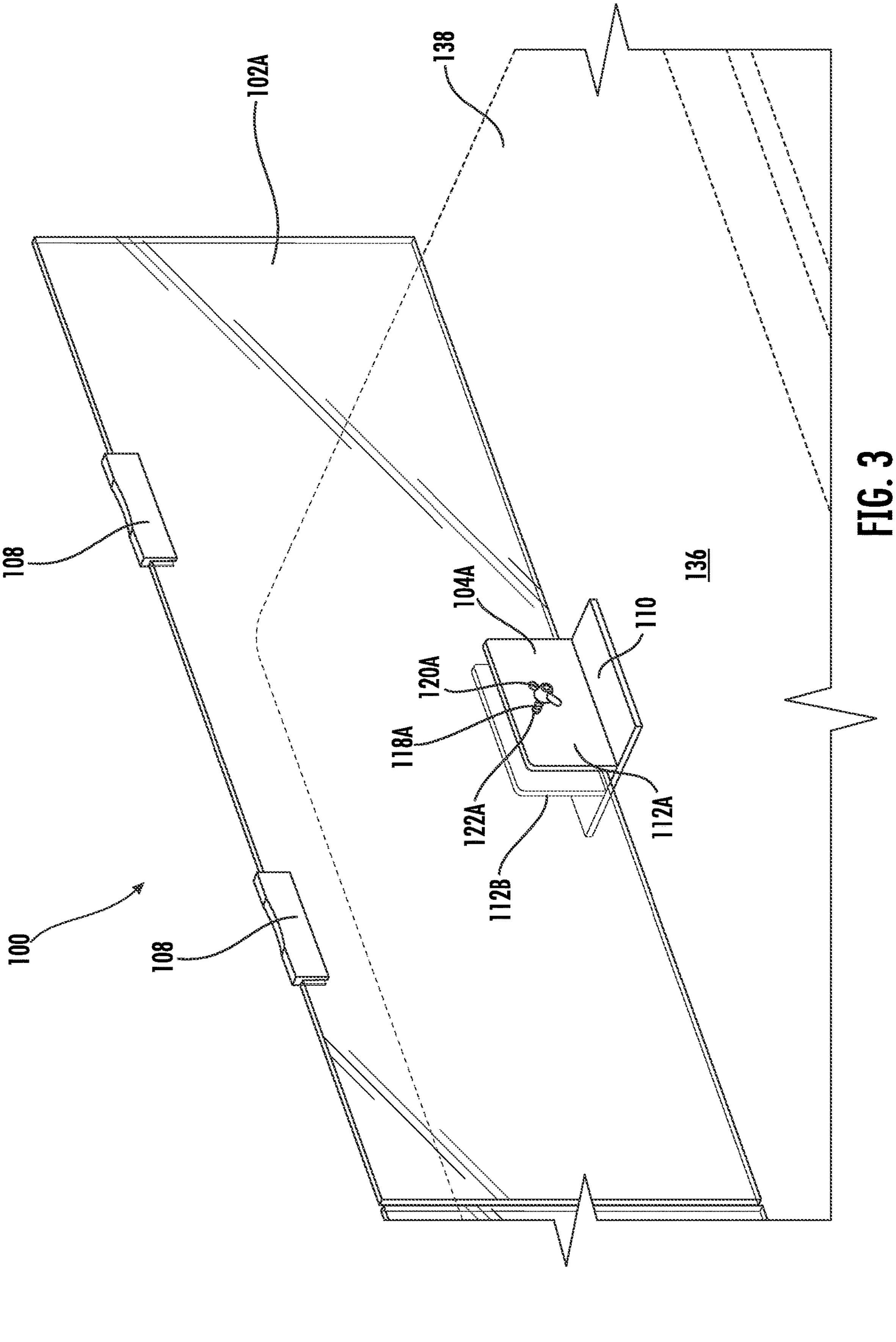
FIG. 3 shows a close-up perspective view of the first attachment member shown in FIG. 1 and FIG. 2.
Figure 4:
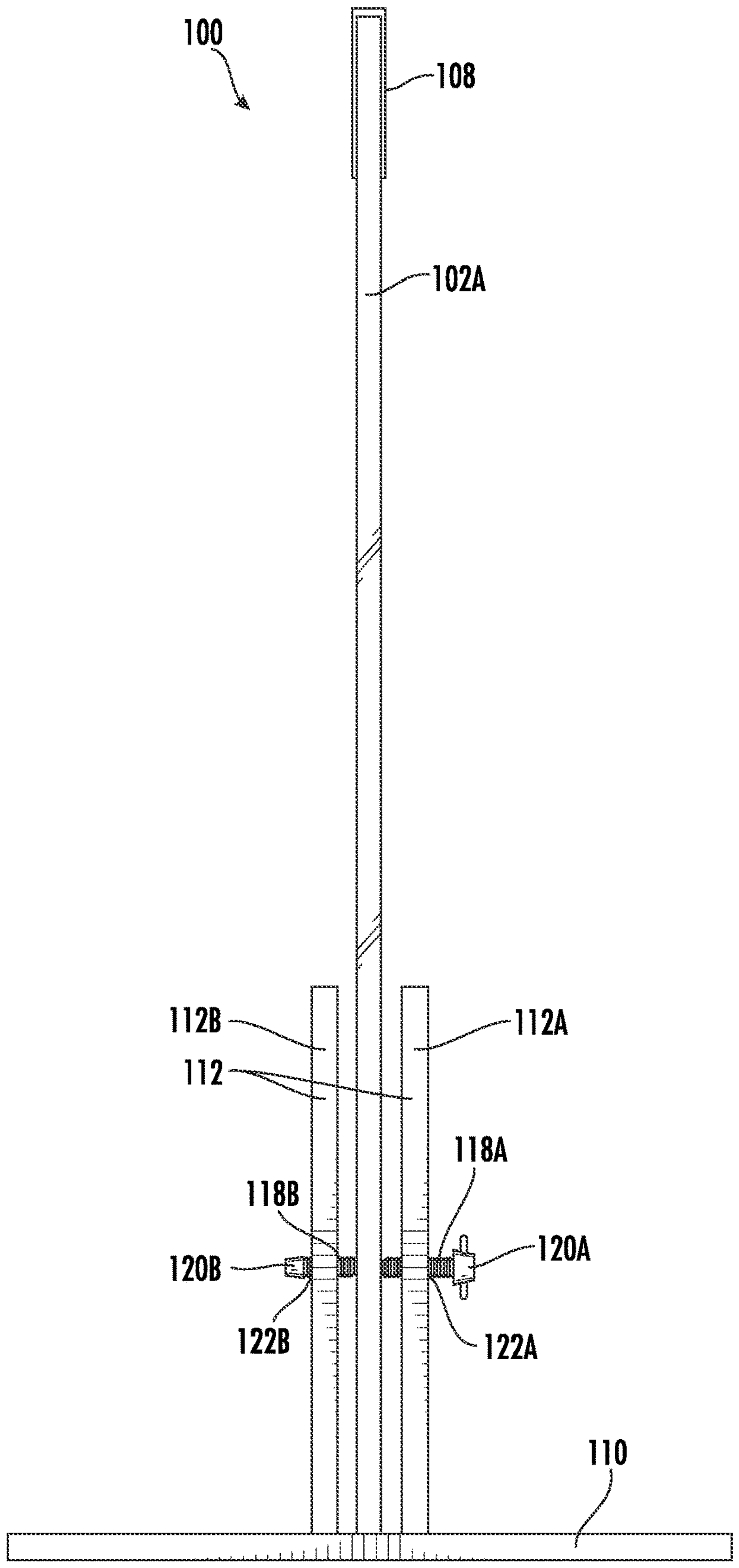
FIG. 4 shows an end view of the first attachment member shown in FIG. 1 and FIG. 2.

The first attachment member 104A, shown up close in FIGS. 3-4, preferably includes a first base plate 110 and a first pair of parallel vertical holders 112 extending up perpendicularly from the first base plate 110. In a preferred embodiment, the first base plate 110 is welded to the first pair of vertical holders 112. In an alternative embodiment, the first base plate 110 and the first pair of vertical holders 112 are formed as a single piece by metal or plastic molding techniques known to persons having ordinary skill in the art. The first pair of vertical holders 112 includes a first pair first holder 112A and a first pair second holder 112B. The first pair of parallel vertical holders 112 are spaced apart such that a lower portion 114A of the first planar rigid barrier 102A fits securely between the first pair of parallel vertical holders 112. Preferably, enough space is present between the first pair of parallel vertical holders 112 such that the first planar rigid barrier 102A can be slid into place between the first pair first holder 112A and the first pair second holder 112B. Preferably, the first attachment member 104A includes a first securing member 116 which extends through the first pair first holder 112A to further secure the first planar rigid barrier 102A to the first attachment member 104A. In one embodiment, the first securing member 116 may include a first threaded bolt 118A including a first plastic knob 120A wherein the first threaded bolt 118A extends through a first threaded aperture 122A through the first pair first holder 112A. The first securing member 116 may further include a second threaded bolt 118B including a second plastic knob 120B wherein the second threaded bolt 118B extends through a second threaded aperture 122B through the first pair second holder 112B. Preferably, the first pair of parallel vertical holders 112 are layered with padding such as, for example a layer of rubber or a layer of felt. The purpose of the padding is to protect the first planar rigid barrier 102A when it is being secured inside the first pair of vertical holders 112 and to provide a snugger fit. The length of the first base plate 110 is preferably about 11 inches and the width of the first base plate 110 is preferably about 5 inches. In this context, "about" is defined as plus or minus 2 inches. However, these dimensions are preferred dimensions, and this disclosure is not intended to be limited by the preferred ranges of length. The first attachment member 104A is preferably made of metal or metal alloy, but other materials are contemplated including wood, plastic, composite materials, and rubber.

Figure 5:
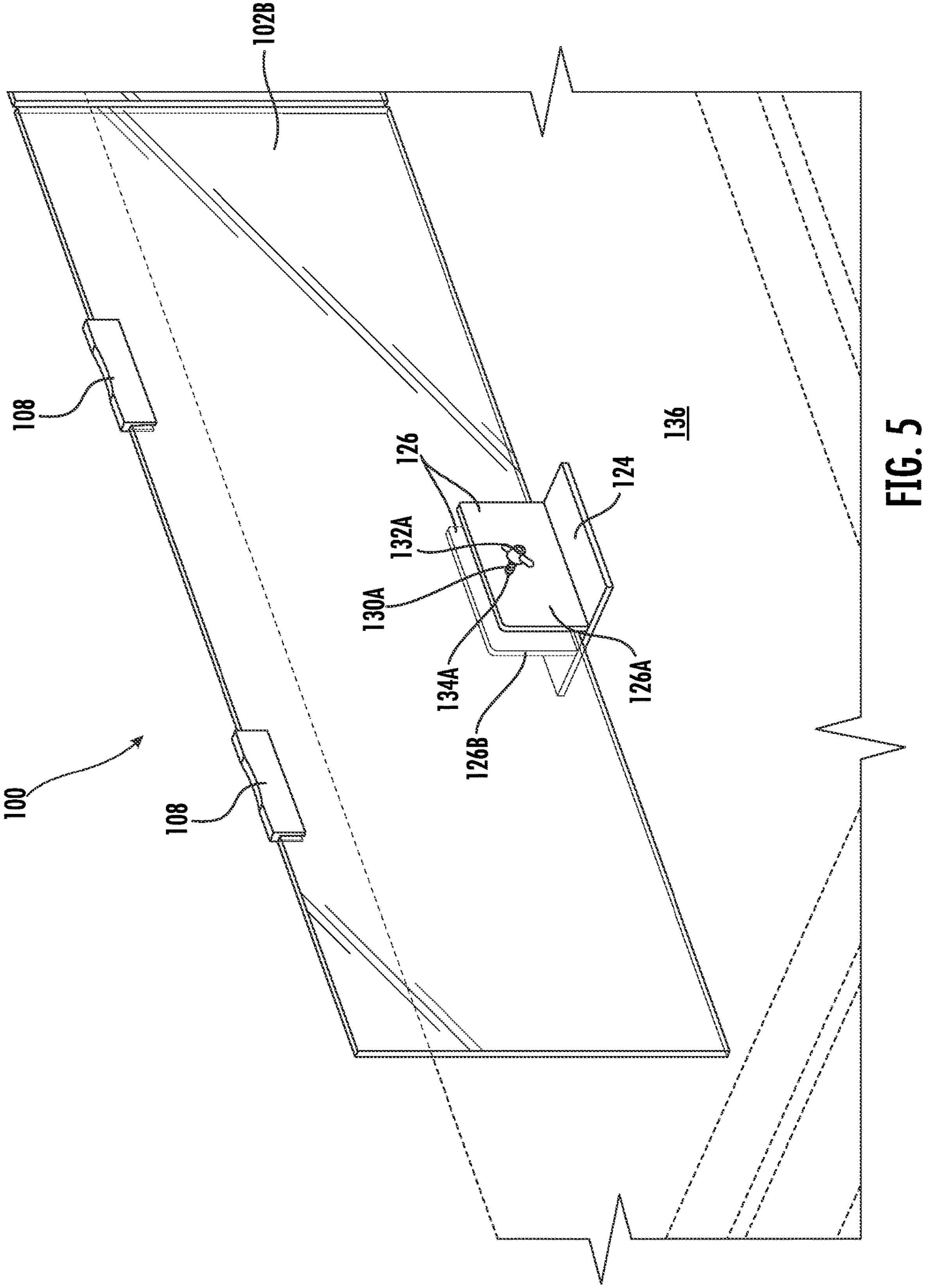
FIG. 5 shows a close-up perspective view of the second attachment member shown in FIG. 2.
Figure 6:
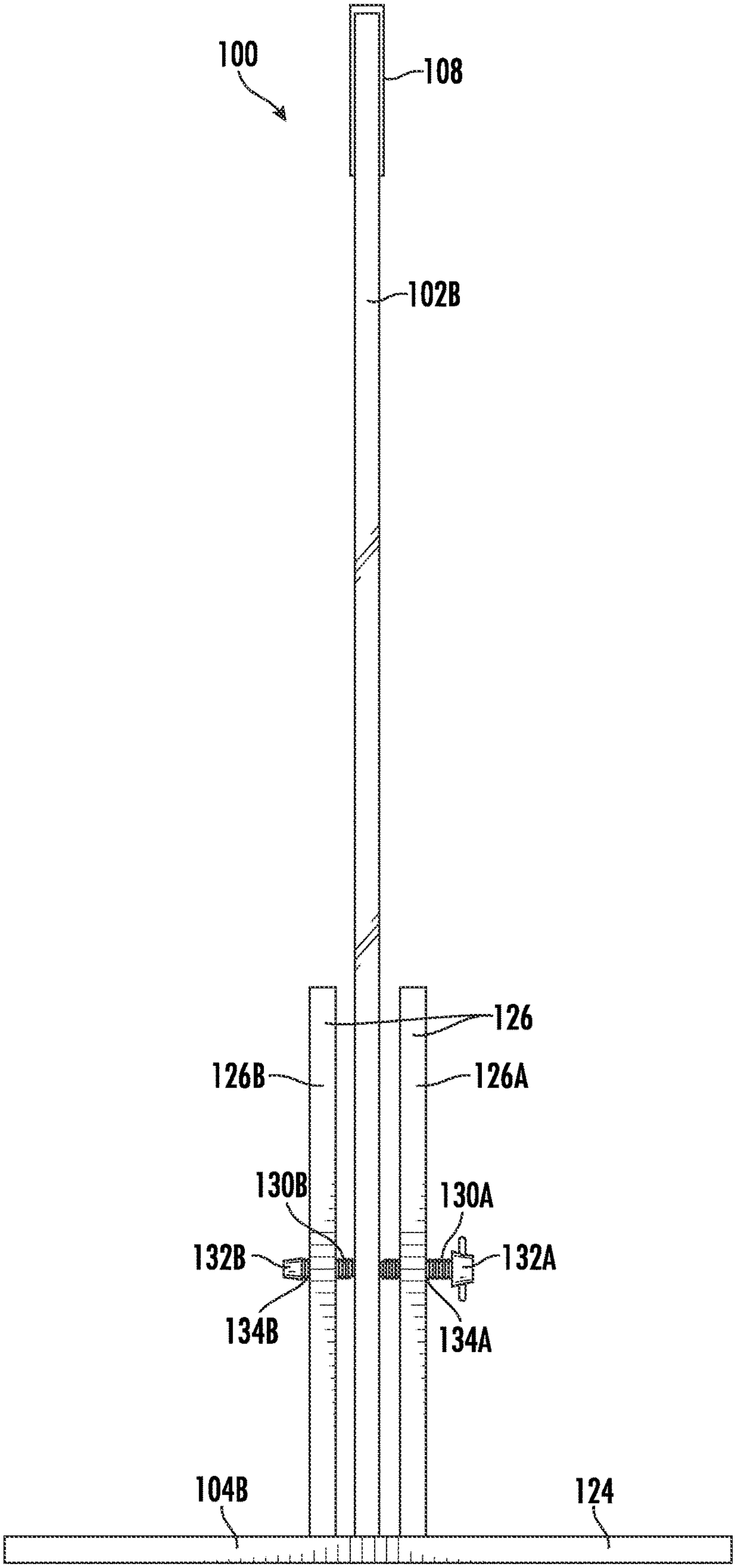
FIG. 6 shows an end view of the second attachment member shown in FIG. 2 and FIG. 5.

The second attachment member 104B, shown in FIGS. 5-6, preferably includes a second base plate 124 and a second pair of parallel vertical holders 126 extending up perpendicularly from the second base plate 124. In a preferred embodiment, the second base plate 124 is welded to the second pair of vertical holders 126. In an alternative embodiment, the second base plate 124 and the second pair of vertical holders 126 are formed as a single piece by metal or plastic molding techniques known to persons having ordinary skill in the art. The second pair of vertical holders 126 includes a second pair first holder 126A and a second pair second holder 126B. The second pair of parallel vertical holders 126 are spaced apart such that a lower portion 114B of the second planar rigid barrier 102B fits securely between the second pair of parallel vertical holders 126. Preferably, enough space is present between the second pair of parallel vertical holders 126 such that the second planar rigid barrier 102B can be slid into place between the second pair first holder 126A and the second pair second holder 126B. Preferably, the second attachment member 104B includes a second securing member 128 which extends through the second pair first holder 126A to further secure the second planar rigid barrier 102B to the second attachment member 104B. In one embodiment, the second securing member 128 may include a third threaded bolt 130A including a third plastic knob 132A wherein the third threaded bolt 130A extends through a third threaded aperture 134A through the second pair first holder 126A. The second securing member 128 may further include a fourth threaded bolt 130B including a fourth plastic knob 132B wherein the fourth threaded bolt 130B extends through a fourth threaded aperture 134B through the second pair second holder 126B. Preferably, the second pair of parallel vertical holders 126 are layered with padding such as, for example a layer of rubber or a layer of felt. The purpose of the padding is to protect the second planar rigid barrier 102B when it is being secured inside the second pair of vertical holders 126 and to provide a snugger fit. The length of the second base plate 124 is preferably about 11 inches and the width of the first base plate 124 is preferably about 5 inches. In this context, "about" is defined as plus or minus 2 inches. However, these dimensions are preferred dimensions, and this disclosure is not intended to be limited by the preferred ranges of length. The second attachment member 104B is preferably made of metal or metal alloy, but other materials are contemplated including wood, plastic, composite materials, and rubber.

In the embodiment shown in FIG. 2, the first attachment member 104A and the second attachment member 104B rest on an upper surface 136 of a physical therapy table 138. The first attachment member 104A and the second attachment member 104B are preferably positioned so that the physical therapy protective screen apparatus 100 bisects said surface 136 of said physical therapy table 138. The first attachment member 104A and the second attachment member 104B can be placed on said upper surface 136 of said physical therapy table 138 before attaching the first planar rigid barrier 102A and the second planar rigid barrier 102B, or, alternatively, the first planar rigid barrier 102A and the second planar rigid barrier 102B can be attached to the first attachment member 104A and the second attachment member 104B, respectively, before the physical therapy protective screen apparatus 100 is placed on said upper surface 136 of said physical therapy table 138.

Figure 7:
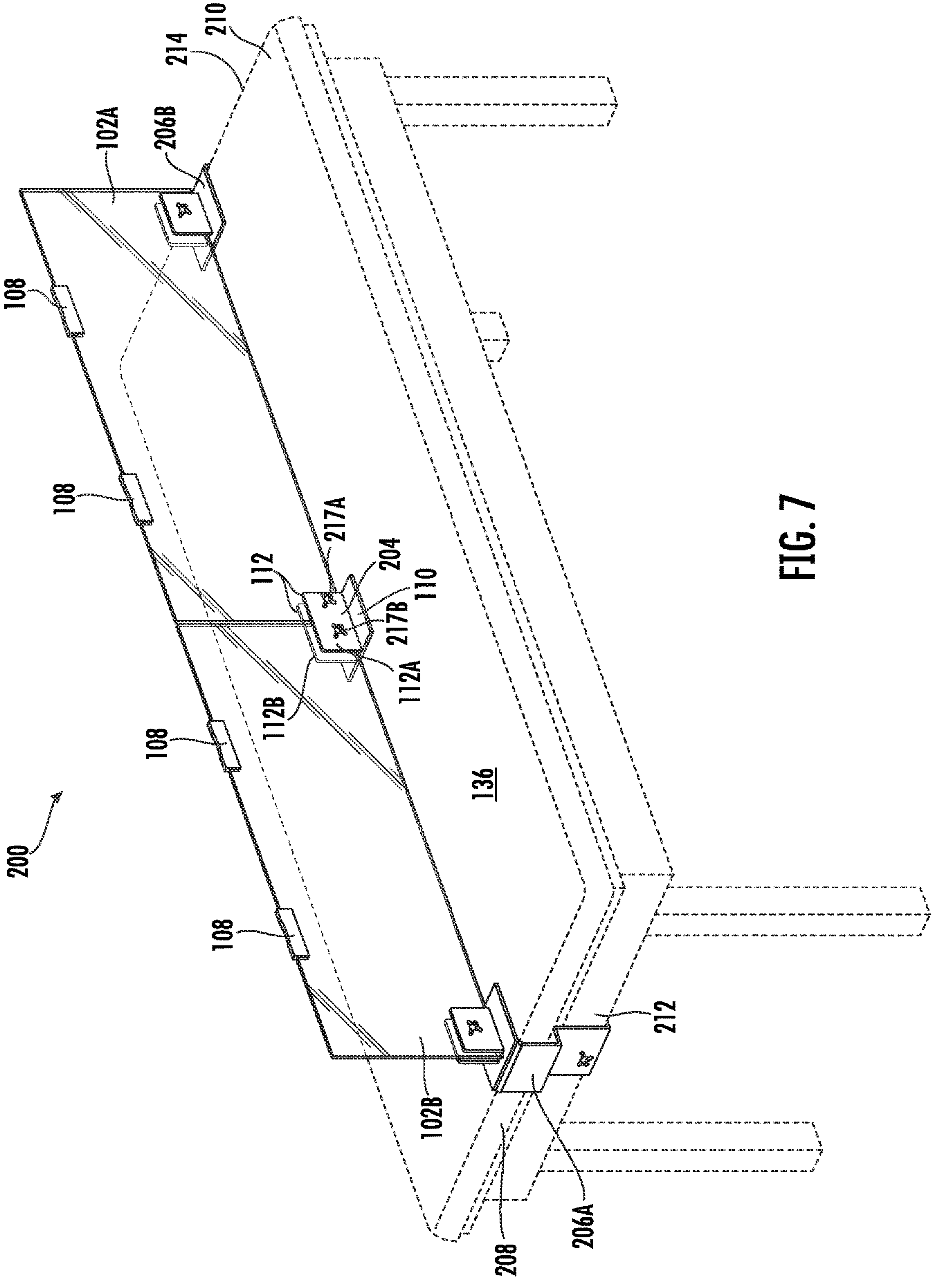
FIG. 7 shows a perspective view of a physical therapy protective screen apparatus including a first planar rigid barrier, a second planar rigid barrier, a first attachment member, a second attachment member, and a third attachment member.
Figure 8:
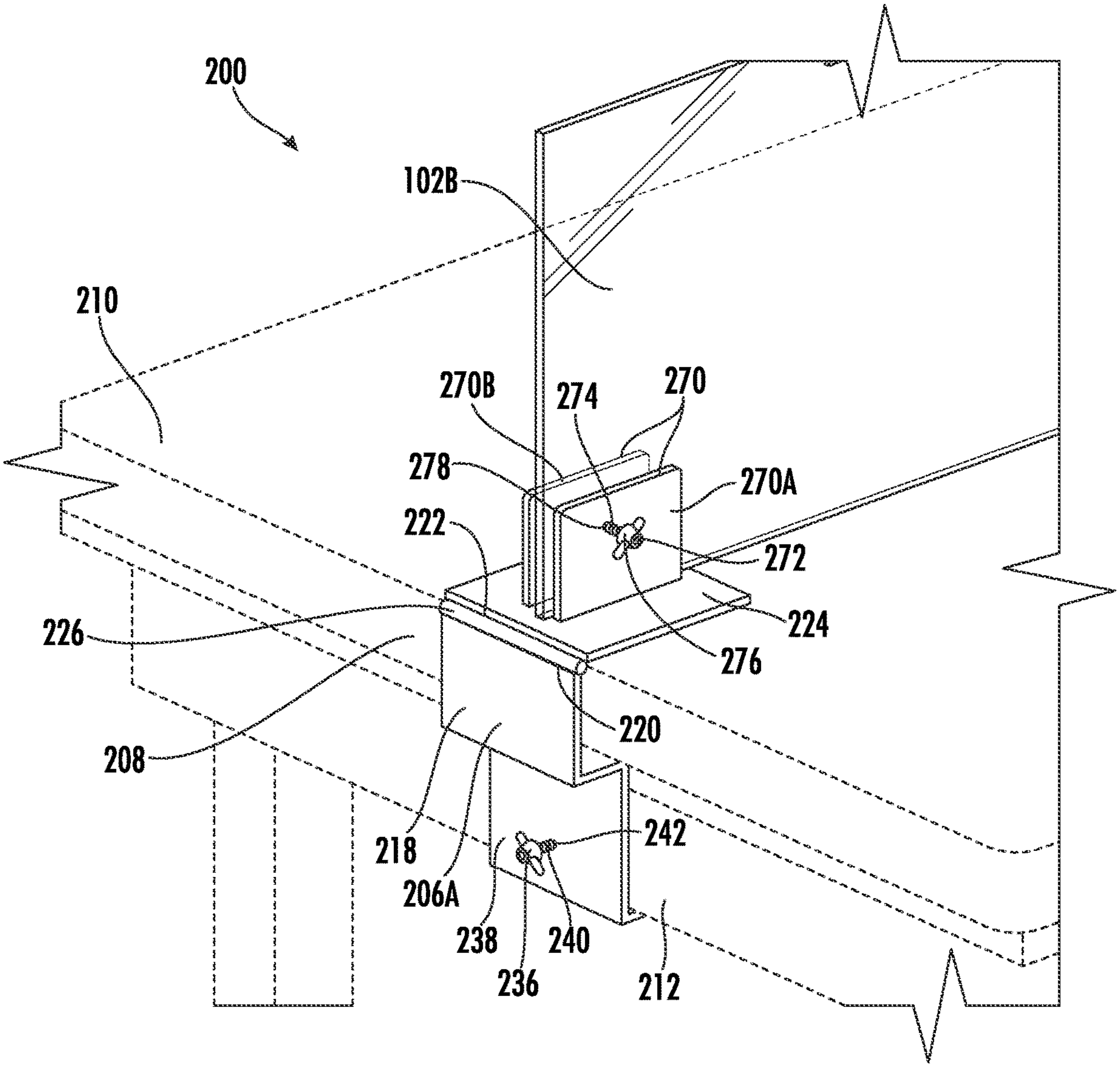
FIG. 8 shows another perspective view of the physical therapy protective screen apparatus show in FIG. 7, wherein the view in FIG. 8 shows the second attachment member attached to a physical therapy table.
Figure 9:
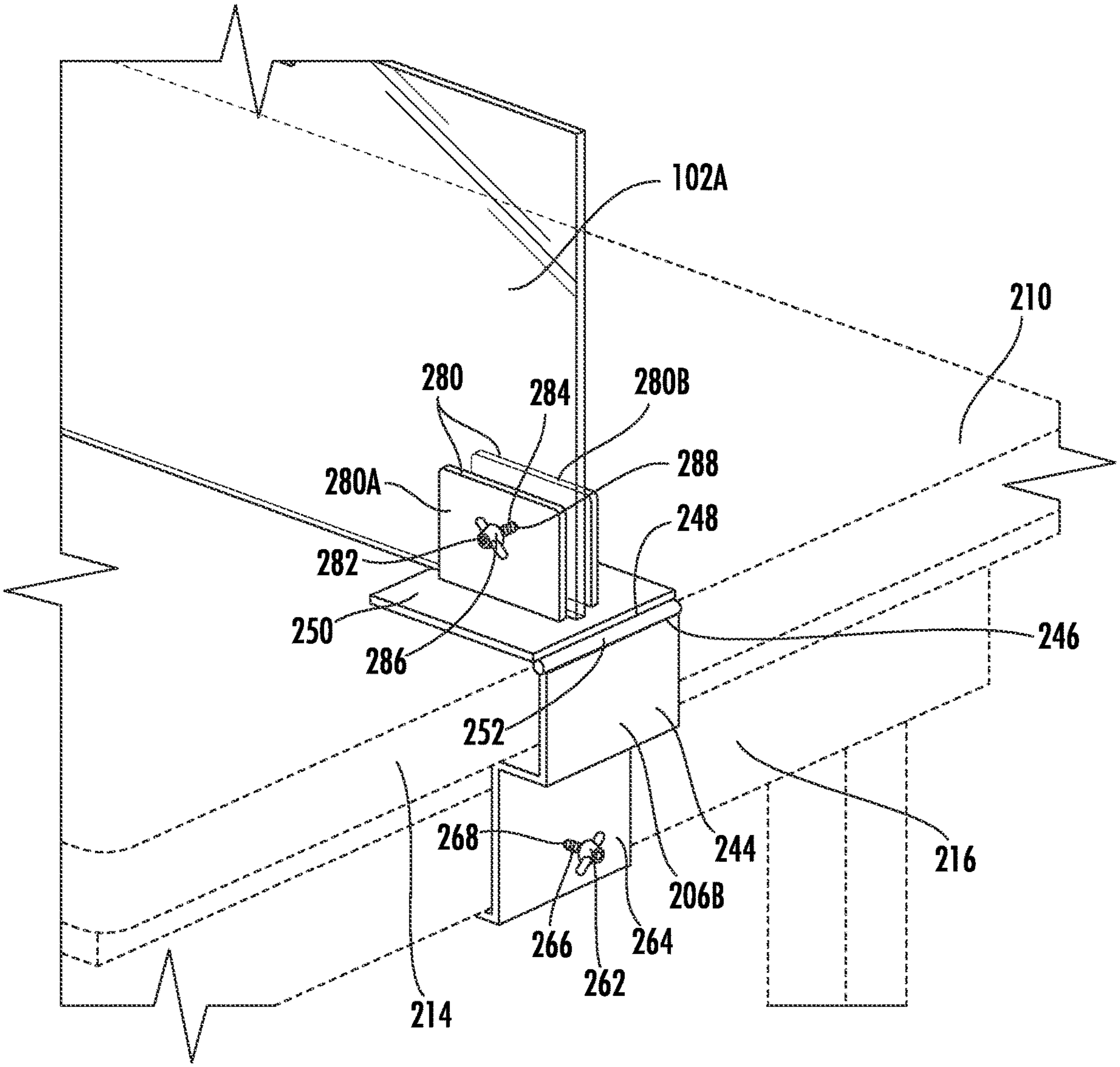
FIG. 9 shows yet another perspective view of the physical therapy protective screen apparatus show in FIG. 7 and FIG. 8, wherein the view in FIG. 9 shows the third attachment member attached to said physical therapy table.

FIG. 7 shows another embodiment of a physical therapy protective screen apparatus 200 including the first planar rigid barrier 102A, the second planar rigid barrier 102B, a first attachment member 204 very similar to the first attachment member 104A, a second attachment member 206A, and a third attachment member 206B. One difference with this embodiment is that at the second attachment member 206A wraps around a first edge 208 of a physical therapy table 210 and wraps around and attaches to a first portion 212 of a base frame of said physical therapy table 210 as shown in FIG. 8. Additionally, the third attachment member 206B wraps around a second edge 214 of said physical therapy table 210 and wraps around and attaches to a second portion of said base frame 216 of said physical therapy table 210 as shown in FIG. 9.

The first attachment member 204 is very similar to the first attachment member 104A because the first attachment member 204 also includes the first base plate 110 and the first pair of vertical holders 112. The main difference between the first attachment member 104A and the first attachment member 204 is that, in addition to the first securing member 116 (shown as 217A in FIG. 7), the first attachment member 204 further includes a second securing member 217B. The first securing member 217A is used to secure a lower portion 114A of the first planar rigid barrier 102A to the first securing member 204. The second securing member 217B is used to secure a lower portion 114B of the second planar rigid barrier 102B to the first attachment member 204.

Figure 10:
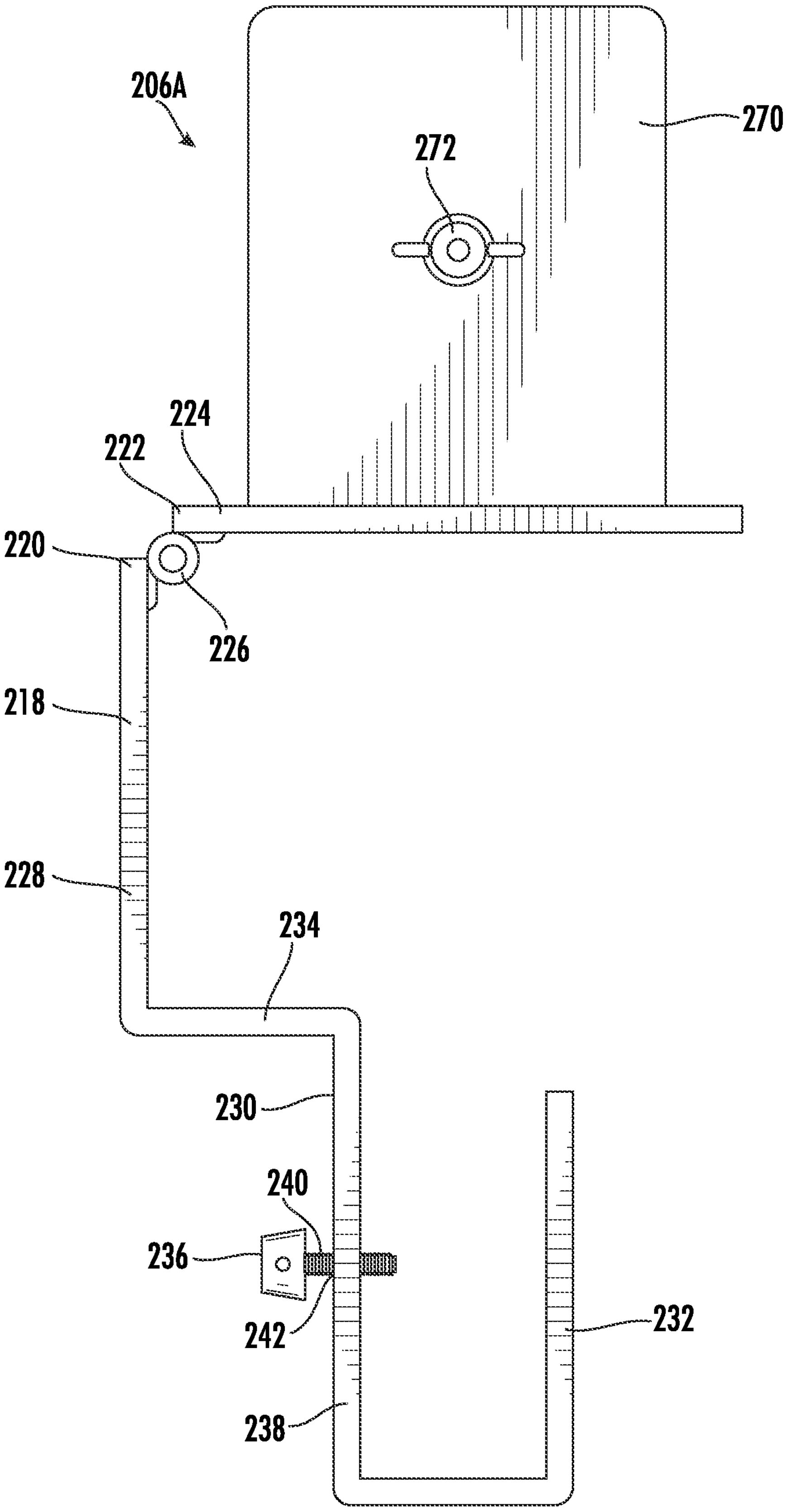
FIG. 10 shows a side view of the second attachment member shown in FIG. 7 and FIG. 8.

FIG. 10 shows a side view of the second attachment member 206A which includes a first side attachment member 218 wherein a first end 220 of the first side attachment member 218 is hingedly attached to a first end 222 of a second base plate 224 via a first hinge joint 226. The first side attachment member 218 further includes a first side attachment member first section 228 configured to extend around said first edge 208 of said physical therapy table 210 when the second base plate 224 is located proximate to said first edge 208 of said physical therapy table 210. The first side attachment member 218 further includes a first side attachment member second section 230 including a first U-shaped bracket 232 configured to fit at least partially around said first portion of said base frame 212 of said physical therapy table 210. The first side attachment member 218 preferably includes a first lateral section 234 providing some distance for the first side attachment member 218 to extend around said first edge 208 of said physical therapy table 210. The first side attachment member second section 230 preferably includes a first securing component 236 located along a first side 238 of the first U-shaped bracket 232 wherein the first securing component 236 can be adjusted to exert pressure against said first portion of said base frame 212 of said physical therapy table 210 to secure the first side attachment member 218 to said first portion of said base frame 212 of said physical therapy table 210. The first securing component 236 preferably includes a first threaded tightening bolt 240 which can be screwed inward or outward through a first threaded aperture 242 along the first side 238 of the first U-shaped bracket 232.

Figure 11:
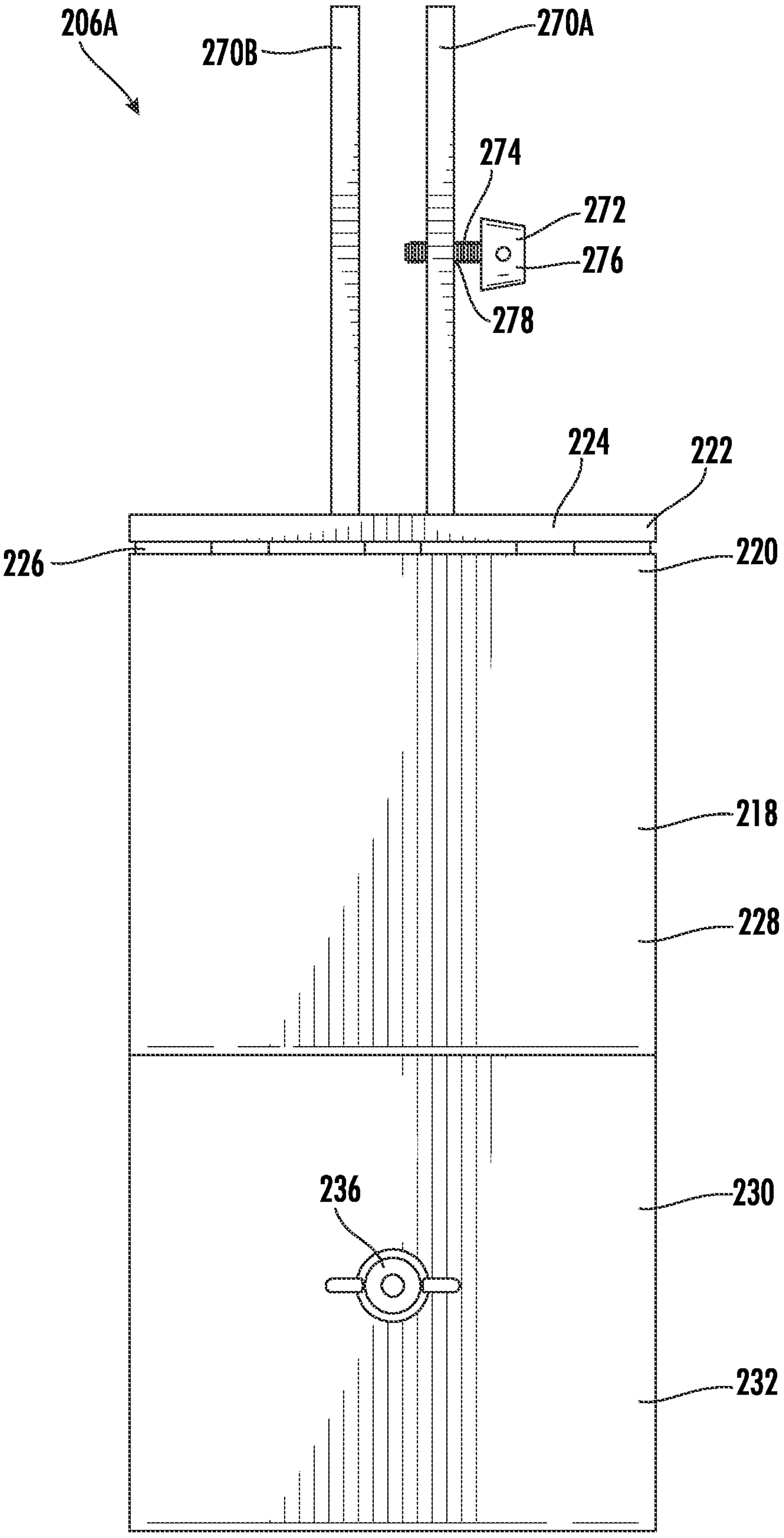
FIG. 11 shows another side view of the second attachment member shown in FIG. 10 wherein the second attachment member has been rotated 90 degrees along a vertical axis.
Figure 12:
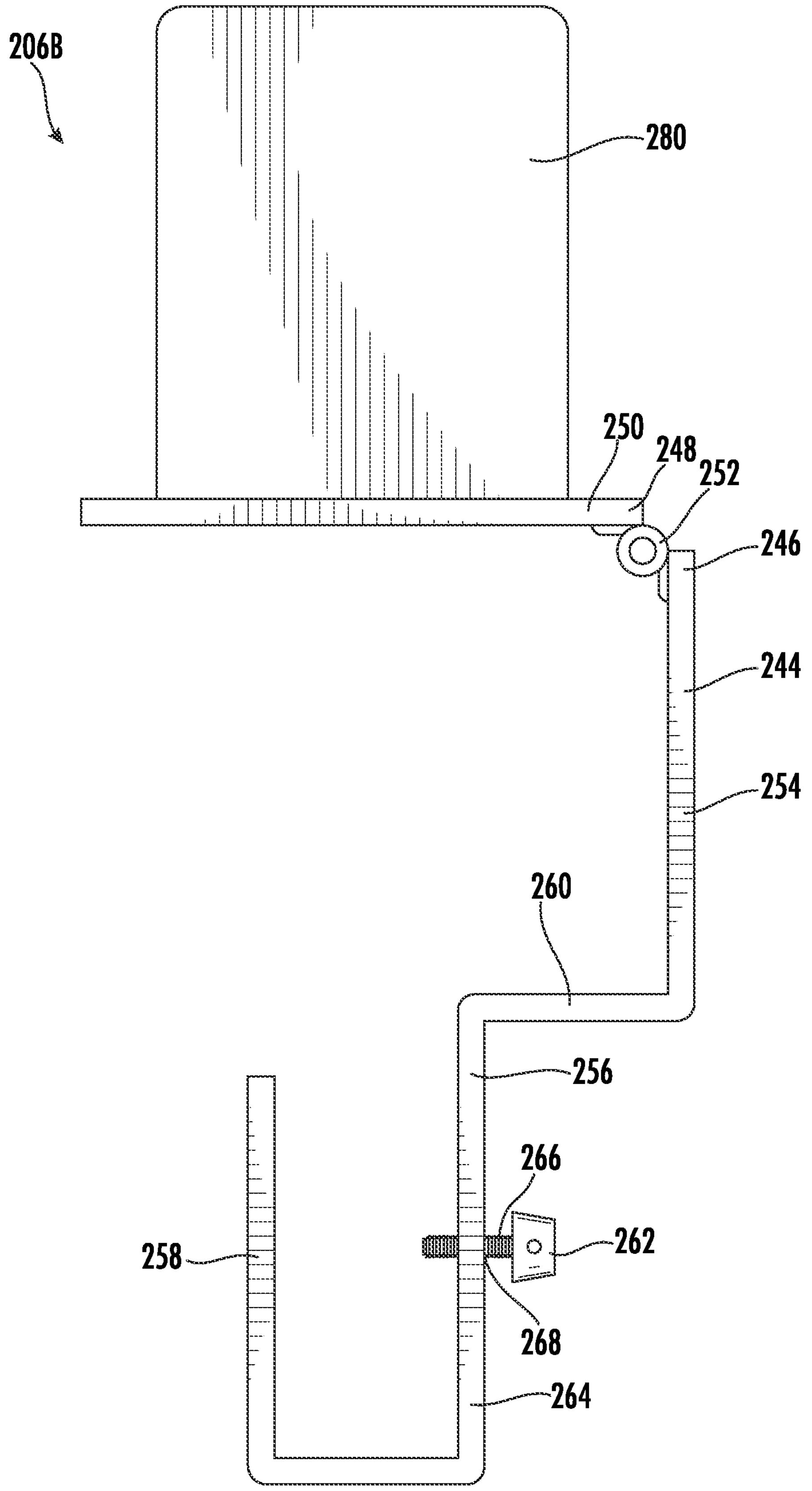
FIG. 12 shows a side view of the third attachment member shown in FIG. 7 and FIG. 9.
Figure 13:
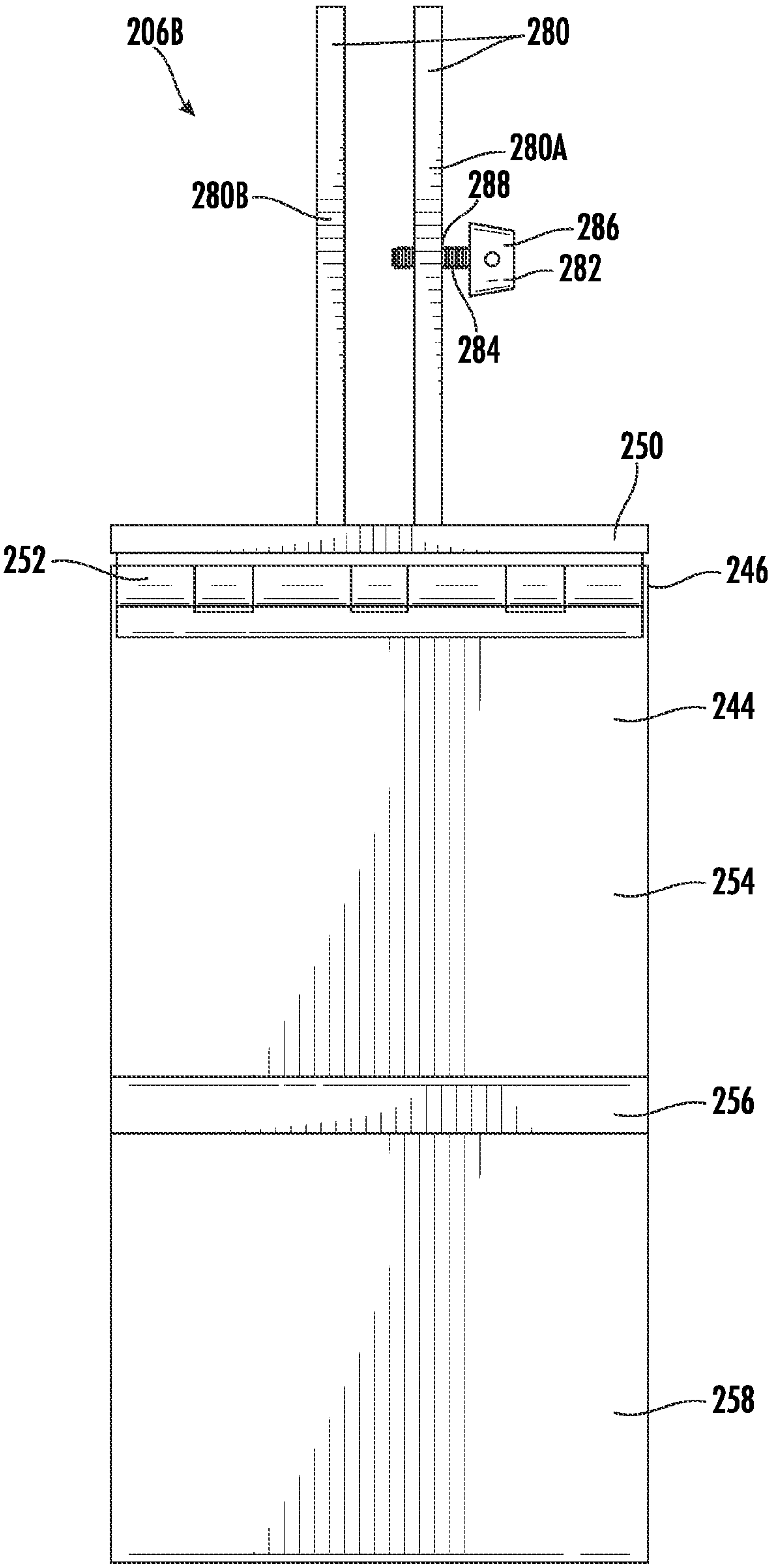
FIG. 13 shows another side view of the third attachment member shown in FIG. 12 wherein the third attachment member has been rotated 90 degrees along a vertical axis.

FIG. 11 shows a side view of the third attachment member 206B which includes a second side attachment member 244 wherein a first end 246 of the second side attachment member 244 is hingedly attached to a first end 248 of a third base plate 250 via a second hinge joint 252. The second side attachment member 244 further includes a second side attachment member first section 254 configured to extend around said second edge 214 of said physical therapy table 210 when the third base plate 250 is located proximate to said second edge 214 of said physical therapy table 210. The second side attachment member 244 further includes a second side attachment member second section 256 including a second U-shaped bracket 258 configured to fit at least partially around said second portion of said base frame 216 of said physical therapy table 210. The second side attachment member 244 preferably includes a second lateral section 260 providing some distance for the second side attachment member 244 to extend around said second edge 214 of said physical therapy table 210. The second side attachment member second section 256 preferably includes a second securing component 262 located along a first side 264 of the second U-shaped bracket 258 wherein the second securing component 262 can be adjusted to exert pressure against said second portion of said base frame 216 of said physical therapy table 210 to secure the second side attachment member 244 to said second portion of said base frame 216 of said physical therapy table 210. The second securing component 262 preferably includes a second threaded tightening bolt 266 which can be screwed inward or outward through a second threaded aperture 268 along the first side 264 of the second U-shaped bracket 258.

As with the first attachment member 204, the second attachment member 206A further includes a second pair of parallel vertical holders 270 extending up perpendicularly from the second base plate 224. The second pair of vertical holders 270 includes a second pair first holder 270A and a second pair second holder 270B. The second pair of parallel vertical holders 270 are spaced apart such that the lower portion 114B of the second planar rigid barrier 102B fits securely between the second pair of parallel vertical holders 270. Preferably, enough space is present between the second pair of parallel vertical holders 270 such that the second planar rigid barrier 102B can be slid into place between the second pair first holder 270A and the second pair second holder 270B. Preferably, the second attachment member 206A includes a first securing member 272 which extends through the second pair first holder 270A to further secure the second planar rigid barrier 102B to the second attachment member 206A. In one embodiment, the first securing member 272 may include a threaded bolt 274 including a plastic knob 276 wherein the bolt 274 extends through a threaded aperture 278 through the second pair first holder 270A.

The third attachment member 206B further includes a third pair of parallel vertical holders 280 extending up perpendicularly from the second base plate 250. The third pair of vertical holders 280 includes a third pair first holder 280A and a third pair second holder 280B. The third pair of parallel vertical holders 280 are spaced apart such that the lower portion 114A of the first planar rigid barrier 102A fits securely between the third pair of parallel vertical holders 280. Preferably, enough space is present between the third pair of parallel vertical holders 280 such that the first planar rigid barrier 102A can be slid into place between the third pair first holder 280A and the third pair second holder 280B. Preferably, the third attachment member 206B includes a second securing member 282 which extends through the third pair first holder 280A to further secure the first planar rigid barrier 102A to the third attachment member 206B. In one embodiment, the second securing member 282 may include a threaded bolt 284 including a plastic knob 286 wherein the bolt 284 extends through a threaded aperture 288 through the third pair first holder 280A.

Although three different embodiments of a physical therapy protective screen apparatus are provided above, the attachment members could be used in different combinations. For example, a physical therapy protective screen apparatus might employ the first attach member 104 shown FIG. 1 and the third attachment member 206B shown in FIG. 9.

Figure 14:
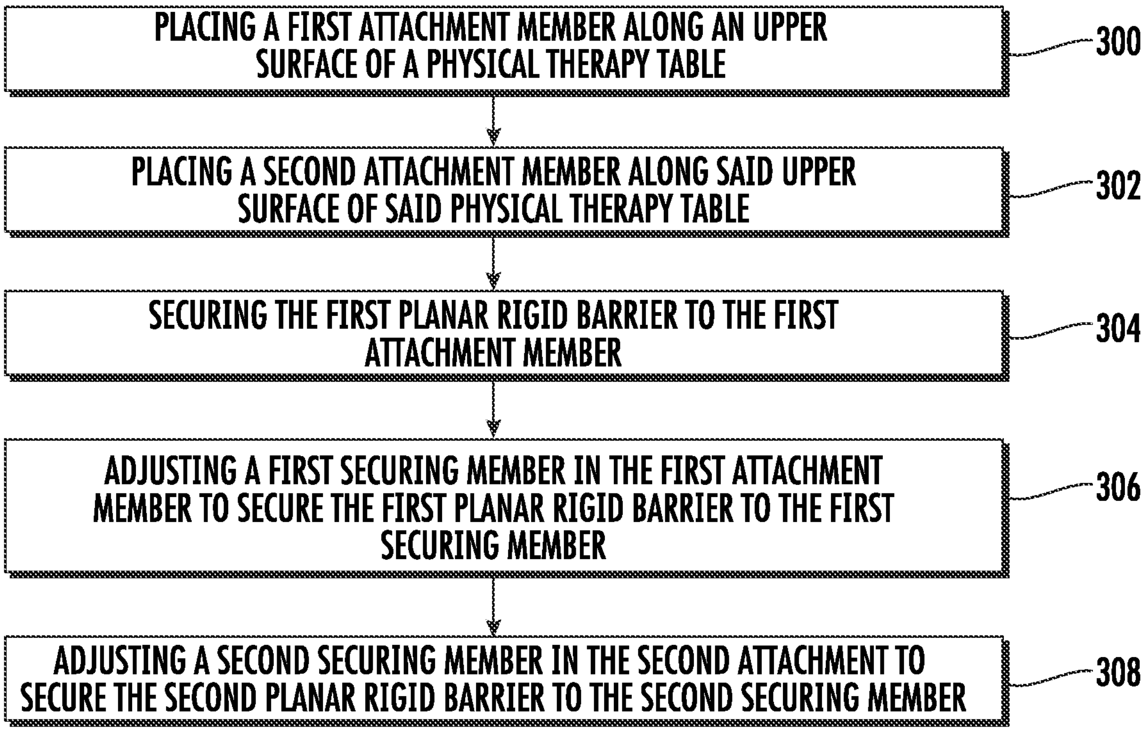
FIG. 14 shows a first embodiment of a method for physically screening patients on a physical therapy table using a physical protective screen apparatus.
Figure 15:
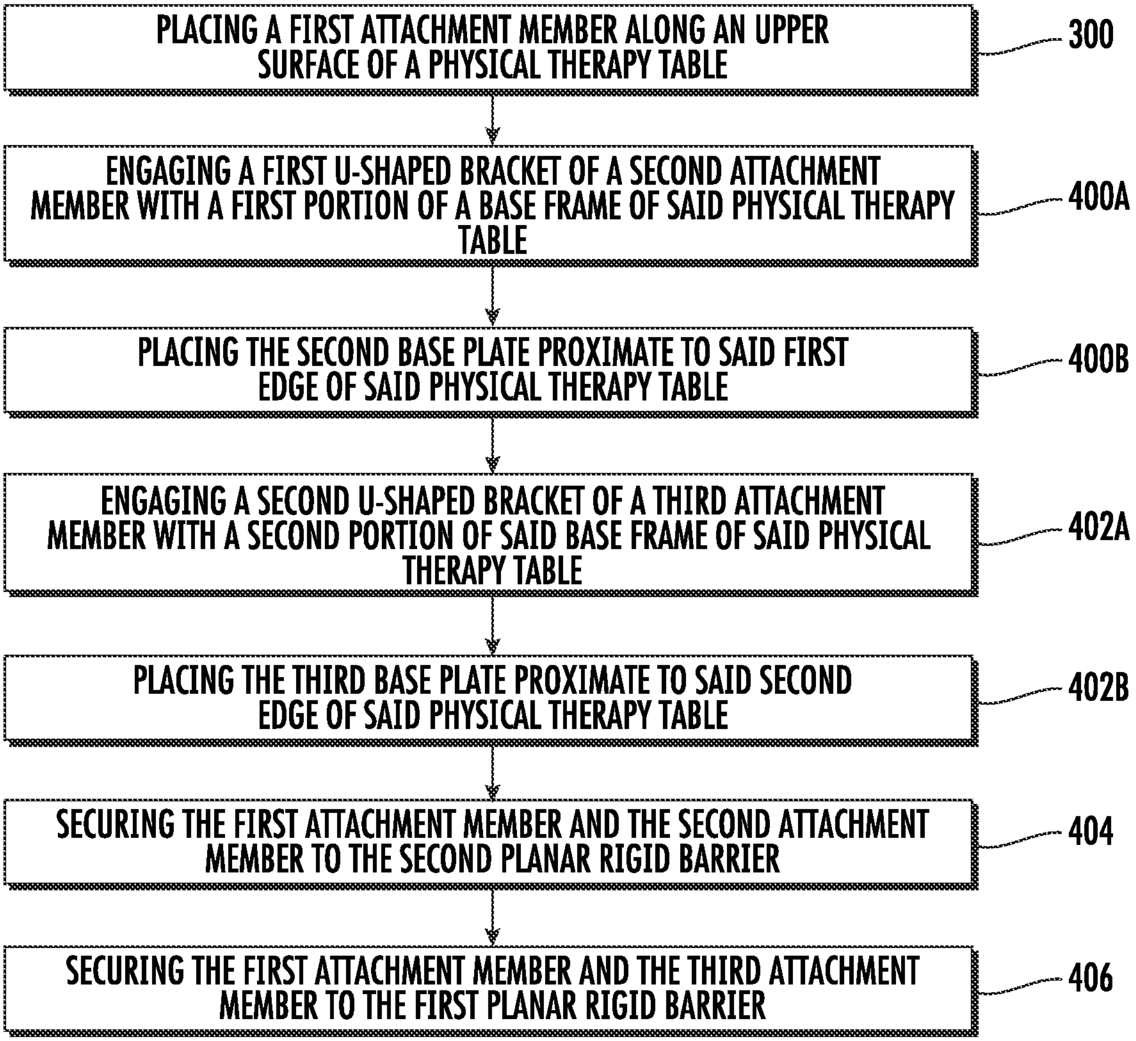
FIG. 15 shows a second embodiment of a method for physically screening patients on a physical therapy table using a physical protective screen apparatus.

In addition to the apparatuses described above, methods for physically screening patients on a physical therapy table using a physical protective screen apparatus are also disclosed as shown in FIGS. 14-15. A first general method includes 300 placing a first attachment member along an upper surface of a physical therapy table, the first attachment member comprising a first base plate and a first pair of parallel vertical holders extending up perpendicularly from the first base plate, the first pair of parallel vertical holders being spaced apart in a configuration such that a lower portion of a first planar rigid barrier can fit securely between the first pair of parallel vertical holders; 302 placing a second attachment member along said upper surface of said physical therapy table, the second attachment member comprising a second base plate and a second pair of parallel vertical holders extending up perpendicularly from the second base plate, the second pair of parallel vertical holders being spaced apart in a configuration such that a second lower portion of the planar rigid barrier can fit securely between the second pair of parallel vertical holders; 304 securing the first planar rigid barrier to the first attachment member by inserting the lower portion of the rigid planar barrier between the first pair of vertical parallel holders; and 306 securing the second planar rigid barrier to the second attachment member by inserting the lower portion of the rigid planar barrier between the second pair of vertical parallel holders. In one embodiment, only steps 300 and 304 apply and no second attachment member or second planar rigid barrier are used. The steps in the embodiments described above do not have to occur in the order in which they are numbered. For example, the first planar rigid barrier can be attached to the first attachment member before the first attachment member is placed on said upper surface of said physical therapy table.

In a related embodiment, the securing step 304 may further include 308 adjusting a first securing member in the first attachment member to secure the first planar rigid barrier to the first securing member; and 310 adjusting a second securing member in the second attachment member to secure the second planar rigid barrier to the second securing member.

In a related embodiment, the step of 302 placing the second attachment member along an upper surface of a physical therapy table may further include 400A engaging a first U-shaped bracket of the second attachment member with a first portion of a base frame of said physical therapy table, wherein the second attachment member further includes a first side attachment member wherein a first end of the first side attachment member is hingedly attached to a first end of the second base plate, the first side attachment member further including (i) a first side attachment member first section configured to extend around a first outer edge of said physical therapy table when the first base plate is located proximate to a first edge of said physical therapy table and (ii) a first side attachment member second section comprising the first U-shaped bracket configured to fit at least partially around said first portion of said base frame of said physical therapy table; and 400B placing the second base plate proximate to said first edge of said physical therapy table. An additional step may include 402 placing a third attachment member along said upper surface of said physical therapy table, the third attachment member comprising a third base plate and a third pair of parallel vertical holders extending up perpendicularly from the third base plate, the third pair of parallel vertical holders being spaced apart in a configuration such that the lower portion of the first planar rigid barrier can fit securely between the third pair of parallel vertical holders. The step of placing the third attachment member along an upper surface of a physical therapy table may further include 402A engaging a second U-shaped bracket of the third attachment member with a second portion of said base frame of said physical therapy table, wherein the third attachment member further comprises a second side attachment member wherein a first end of the second side attachment member is hingedly attached to a first end of the third base plate, the second side attachment member further including (i) a second side attachment member first section configured to extend around a second outer edge of said physical therapy table when the second base plate is located proximate to a second edge of said physical therapy table and (ii) a second side attachment member second section comprising the second U-shaped bracket configured to fit at least partially around said second portion of said base frame of said physical therapy table; and 402B placing the third base plate proximate to said second edge of said physical therapy table. Additional steps preferably include 404 securing the first attachment member and the second attachment member to the second planar rigid barrier; and 406 securing the first attachment member and the third attachment member to the first planar rigid barrier.

In addition to the apparatuses and methods described above, a first kit including the first planar rigid barrier 102A and the first attachment member 104A is disclosed. Additionally, a second kit including the first planar rigid barrier 102A, the second planar rigid barrier 102B, the first attachment member 104A, and the second attachment member 104B is disclosed. A third kit includes the first planar rigid barrier 102A, the first attachment member 204, and the second attachment member 206A. Finally, a fourth kit including the first planar rigid barrier 102A, the second planar rigid barrier 102B, the first attachment member 204, the second attachment member 206A, and the third attachment member 206B is disclosed.

The various embodiments of this disclosure can be used with various types of physical therapy tables to provide a sturdy physical screen between patients. An advantage of this technology includes the fact that it can be retrofitted onto pre-existing physical therapy tables. The apparatus embodiments can be easily assembled and disassembled as needed. The embodiments described herein provide a safer and more private exercise experience for patients who are utilizing double therapeutic mat tables. The presence of the screen comforts patients in providing a physical barrier to prevent the spread of disease while also, in some embodiments, providing privacy. Exercising individuals have increased breathing and are likely to sweat, talk, laugh, and cough in close proximity to other patients, thereby increasing the likelihood of spreading pathogens. Embodiments described herein help maximize a physical therapy clinic's space and physical therapy table usage while simultaneously reducing the risk of the spread of pathogens. The embodiments further provide privacy to patients. When the physical therapy protective screen apparatus 200 is not in use, the first planar rigid barrier 102A, the second planar rigid barrier 102B, and the first attachment member 204 can be removed. However, the second attachment member 206A and the third attachment member 206B can remain attached to said physical therapy table 210 by, for example, rotating second base plate 224 off the physical therapy table 210 by using the first hinge joint 226. The same procedure can be used with the third attachment member 206B. Edges of various components described herein can be rounded off to prevent injury. Components can be covered with padded covers while not in use to provide additional safety.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state “means for” performing a specified function, or “step for” performing a specific function, is not to be interpreted as a “means” or “step” clause as specified in 35 U.S.C. § 112, ¶ 6. In particular, the use of “step of” in the claims herein is not intended to invoke the provisions of 35 U.S.C. § 112, ¶ 6.

What is claimed is:

1. A physical therapy protective screen apparatus configured for use on a physical therapy table, the physical therapy protective screen apparatus comprising: a first planar rigid barrier; and a second planar rigid barrier; a first attachment member including a first base plate and a first pair of parallel vertical holders extending up perpendicularly from the first base plate, the first pair of parallel vertical holders being spaced apart in a configuration such that a lower portion of the first planar rigid barrier fits between the first pair of parallel vertical holders; and a second attachment member including a second base plate and a second pair of parallel vertical holders extending up perpendicularly from the second base plate, the second pair of parallel vertical holders being spaced apart in a configuration such that a lower portion of the second planar rigid barrier fits between the second pair of parallel vertical holders, wherein the second attachment member further comprises: a first side attachment member wherein a first end of the first side attachment member is hingedly attached to a first end of the second base plate, the first side attachment member further comprising: a first side attachment member first section configured to extend around a first outer edge of a physical therapy table when the second base plate is located proximate to a first edge of said physical therapy table; and a first side attachment member second section comprising a first U-shaped bracket configured to fit at least partially around a first portion of a base frame of said physical therapy table.

2. The physical therapy protective screen apparatus of claim 1 further comprising: a third attachment member comprising: a third base plate and a third pair of parallel vertical holders extending up perpendicularly from the third base plate, the third pair of parallel vertical holders being spaced apart in a configuration such that a lower portion of the first planar rigid barrier fits between the third pair of parallel vertical holders; a second side attachment member wherein a first end of the second side attachment member is hingedly attached to a first end of the third base plate, the second side attachment member further comprising: a second side attachment member first section configured to extend around a second outer edge of said physical therapy table when the third base plate is located proximate to a second edge of said physical therapy table; and a second side attachment member second section comprising a second U-shaped bracket configured to fit at least partially around a second portion of a base frame of said physical therapy table.

3. The physical therapy protective screen apparatus of claim 2 wherein the second side attachment member second section includes a second securing component located along a first side of the second U-shaped bracket wherein the second securing component can be adjusted to exert pressure against said second portion of said base frame of said physical therapy table to secure the second side attachment member to said first portion of said base frame of said physical therapy table.

4. The physical therapy protective screen apparatus of claim 3 wherein the second securing component comprises a second threaded tightening bolt which can be screwed inward or outward through a second threaded aperture along the first side of the second U-shaped bracket.

5. The physical therapy protective screen apparatus of claim 1 wherein the first side attachment member second section includes a first securing component located along a first side of the first U-shaped bracket wherein the first securing component can be adjusted to exert pressure against said first portion of said base frame of said physical therapy table to secure the first side attachment member to said first portion of said base frame of said physical therapy table.

6. The physical therapy protective screen apparatus of claim 5 wherein the first securing component comprises a first threaded tightening bolt which can be screwed inward or outward through a first threaded aperture along the first side of the first U-shaped bracket.

7. The physical therapy protective screen of claim 1 wherein the first attachment member further comprises a first securing member extending through one of the vertical holders of the first pair of vertical holders to secure the first planar rigid barrier to the first attachment member.

8. The physical therapy protective screen of claim 7 wherein the first attachment member further comprises a second securing member extending through one of the vertical holders of the first pair of vertical holders to secure the second planar rigid barrier to the first attachment member.

9. The physical therapy protective screen apparatus of claim 1 further comprising the first attachment member resting on a physical therapy table.

10. A method for physically screening patients on a physical therapy table, the method comprising: placing a first attachment member along an upper surface of a physical therapy table, the first attachment member comprising a first base plate and a first pair of parallel vertical holders extending up perpendicularly from the first base plate, the first pair of parallel vertical holders being spaced apart in a configuration such that a lower portion of a first planar rigid barrier can fit between the first pair of parallel vertical holders; and securing the first planar rigid barrier to the first attachment member by inserting the lower portion of the first planar rigid barrier between the first pair of vertical parallel holders; placing a second attachment member along said upper surface of said physical therapy table, the second attachment member comprising a second base plate and a second pair of parallel vertical holders extending up perpendicularly from the second base plate, the second pair of parallel vertical holders being spaced apart in a configuration such that a lower portion of a second planar rigid barrier can fit between the second pair of parallel vertical holders; and securing the second planar rigid barrier to the second attachment member by inserting the lower portion of the second planar rigid barrier between the second pair of vertical parallel holders, wherein the placing the second attachment member along an upper surface of a physical therapy table further comprises: engaging a first U-shaped bracket of the second attachment member with a first portion of a base frame of said physical therapy table, wherein the second attachment member further comprises a first side attachment member wherein a first end of the first side attachment member is hingedly attached to a first end of the second base plate, the first side attachment member further comprising (i) a first side attachment member first section configured to extend around a first outer edge of said physical therapy table when the second base plate is located proximate to a first edge of said physical therapy table and (ii) a first side attachment member second section comprising the first U-shaped bracket configured to fit at least partially around said first portion of said base frame of said physical therapy table; and placing the second base plate proximate to said first edge of said physical therapy table.

11. The method of claim 10 further comprising: placing a third attachment member along an upper surface of said physical therapy table, the third attachment member comprising a third base plate and a third pair of parallel vertical holders extending up perpendicularly from the third base plate, the third pair of parallel vertical holders being spaced apart in a configuration such that a lower portion of the first planar rigid barrier can fit between the third pair of parallel vertical holders; engaging a second U-shaped bracket of the third attachment member with a second portion of said base frame of said physical therapy table, wherein the third attachment member further comprises a second side attachment member wherein a first end of the second side attachment member is hingedly attached to a first end of the third base plate, the second side attachment member further comprising (i) a second side attachment member first section configured to extend around a second outer edge of said physical therapy table when the third base plate is located proximate to a second edge of said physical therapy table and (ii) a second side attachment member second section comprising the second U-shaped bracket configured to fit at least partially around said second portion of said base frame of said physical therapy table; placing the third base plate proximate to said second edge of said physical therapy table; and securing the first planar rigid barrier to the third attachment member by inserting the lower portion of the first planar rigid barrier between the third pair of vertical parallel holders.

12. The method of claim 11 wherein the placing a third attachment member along an upper surface of a physical therapy table further comprises adjusting a second securing component wherein the third attachment member comprises the second securing component located along a first side of the second U-shaped bracket wherein the second securing component can be adjusted to exert pressure against said second portion of said base frame of said physical therapy table to secure the second side attachment member to said second portion of said base frame of said physical therapy table.

13. The method of claim 10 wherein the securing the first planar rigid barrier to the first attachment member by inserting the lower portion of the first planar rigid barrier between the first pair of vertical parallel holders further comprises adjusting a first securing member in the first attachment member to secure the first planar rigid barrier to the first securing member.

14. The method of claim 10 wherein the placing the second attachment member along an upper surface of a physical therapy table further comprises adjusting a first securing component wherein the second attachment member comprises the first securing component located along a first side of the first U-shaped bracket wherein the first securing component can be adjusted to exert pressure against said first portion of said base frame of said physical therapy table to secure the first side attachment member to said first portion of said base frame of said physical therapy table.

15. A kit for a physical therapy protective screen apparatus, the kit comprising: a first planar rigid barrier; and a second planar rigid barrier; a first attachment member including a first base plate and a first pair of parallel vertical holders extending up perpendicularly from the first base plate, the first pair of parallel vertical holders being spaced apart in a configuration such that a lower portion of the first planar rigid barrier can fit between the first pair of parallel vertical holders; and a second attachment member including a second base plate and a second pair of parallel vertical holders extending up perpendicularly from the second base plate, the second pair of parallel vertical holders being spaced apart in a configuration such that a lower portion of the second planar rigid barrier can fit between the second pair of parallel vertical holders, wherein the second attachment member further comprises: a first side attachment member wherein a first end of the first side attachment member is hingedly attached to a first end of the second base plate, the first side attachment member further comprising: a first side attachment member first section configured to extend around a first outer edge of a physical therapy table when the second base plate is located proximate to a first edge of said physical therapy table; and a first side attachment member second section comprising a first U-shaped bracket configured to fit at least partially around a first portion of a base frame of said physical therapy table.

16. The kit of claim 15 further comprising: a third attachment member comprising a third base plate and a third pair of parallel vertical holders extending up perpendicularly from the third base plate, the third pair of parallel vertical holders being spaced apart in a configuration such that a lower portion of the first planar rigid barrier can fit between the third pair of parallel vertical holders, the third attachment member further comprising a second side attachment member wherein a first end of the second side attachment member is hingedly attached to a first end of the third base plate, the second side attachment member further comprising: a second side attachment member first section configured to extend around a second outer edge of said physical therapy table when the third base plate is located proximate to a second edge of said physical therapy table; and a second side attachment member second section comprising a second U-shaped bracket configured to fit at least partially around a second portion of a base frame of said physical therapy table; wherein the first side attachment member second section includes a first securing component located along a first side of the first U-shaped bracket wherein the first securing component can be adjusted to exert pressure against said first portion of said base frame of said physical therapy table to secure the first side attachment member to said first portion of said base frame of said physical therapy table; and wherein the second side attachment member second section includes a second securing component located along a first side of the second U-shaped bracket wherein the second securing component can be adjusted to exert pressure against said second portion of said base frame of said physical therapy table to secure the second side attachment member to said first portion of said base frame of said physical therapy table.

17. The kit of claim 16 wherein:

the first attachment member further comprises a first securing member extending through one of the vertical holders of the first pair of vertical holders to secure the first planar rigid barrier to the first attachment member, and a second securing member extending through one of the vertical holders of the first pair of vertical holders to secure the second planar rigid barrier to the first attachment member.

* * * * *